(No Model.)
H. B. CARY.
CAR BRAKE.
No. 517,601. Patented Apr. 3, 1894.
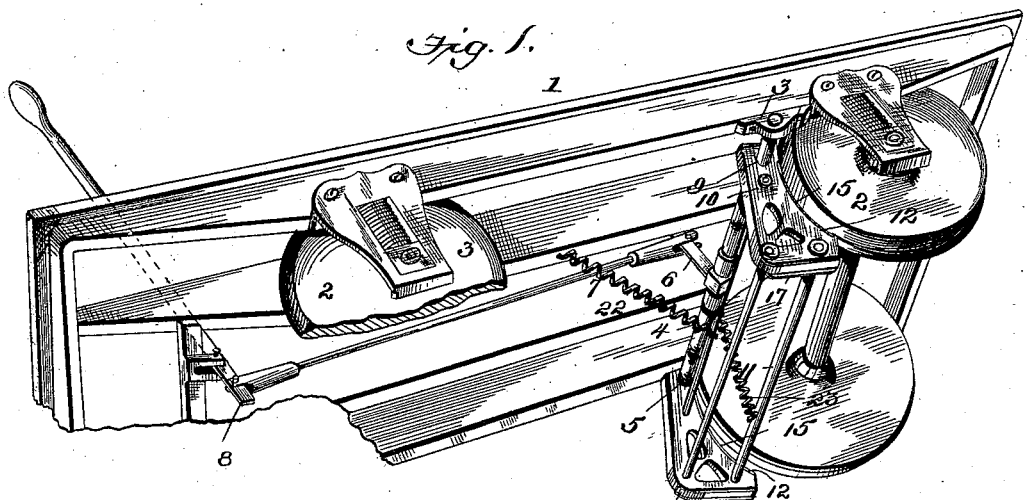
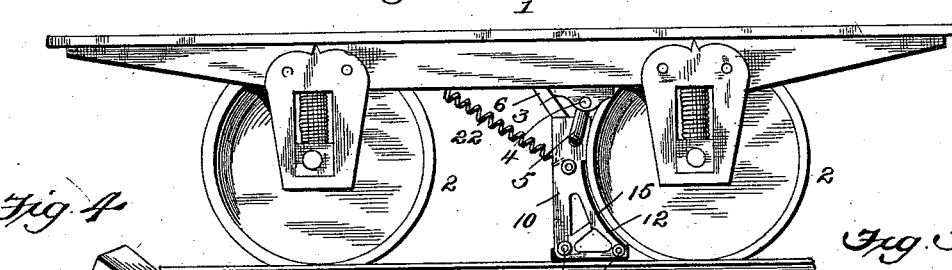
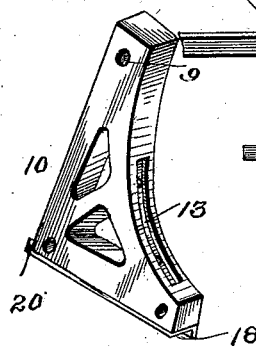
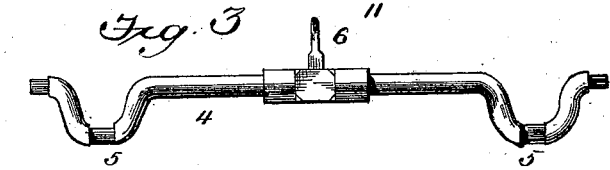
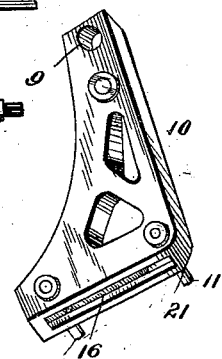
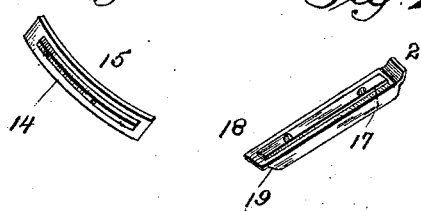
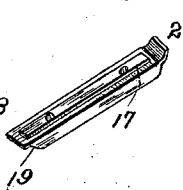
Witnesses
Inventor
By Henry B. Cary.
John Wedderburn
Attorney
THE NATIONAL LITHOGRAPHING COMPANY,
WASHINGTON, D. C.

UNITED STATES PATENT OFFICE.

HENRY B. CARY, OF LOS ANGELES, CALIFORNIA.

CAR-BRAKE.

SPECIFICATION forming part of Letters Patent No. 517,601, dated April 3, 1894.

Application filed June 15, 1893. Serial No. 477,633. (No model.)

*To all whom it may concern:*

Be it known that I, HENRY B. CARY, a citizen of the United States, and a resident of Los Angeles, in the county of Los Angeles and State of California, have invented certain new and useful Improvements in Car-Brakes; and I do hereby declare the following to be a full, clear, and exact description of the invention, such as will enable others skilled in the art to which it appertains to make and use the same.

This invention relates to car-brakes especially designed for use on street-cars, driven either by electricity or cable, or in fact any form of car of this character traveling upon rails.

The present invention consists of a combined track and wheel-brake which co-operates simultaneously to engage both the track and wheel and obviate the sliding of the wheel to form what is termed "flat-wheel," when in locked condition, and also to produce a more responsive action when the brakes are applied to immediately attain the desired result.

In the track-brakes as heretofore constructed, a very strong support was required, which necessitated the increase of the weight of the car, and in many cases there has not been room enough under the trucks to admit of a proper application of the same and, further, they have usually hung mid-way between the wheels and could not be used on curves or switches, as they were at that time off the track.

The object of the present invention, is to avoid the disadvantages heretofore encountered and further to cause the brake to act only when the car is moving in one direction, thereby necessitating the same construction on both the forward and the rear wheels of the truck, so that one brake may be used when the car moves in either direction. In this connection it will be observed, that the said arrangement insures the brake to be always applied to the rear wheels of the truck which is of utmost importance. Also when moving "up-grade" and car is stopped, and held from running back by brake behind the forward wheels, the car may be started from "set-brake," instead of, as at present requiring the brakes to be loosened first and allowing the car to start back, thereby endangering the machinery and requiring greater motive power to place it again in motion in the desired direction.

In the drawings:—Figure 1 is a perspective view looking toward the underside of the truck and showing the improved brake applied thereto. Fig. 2 is a side elevation of the truck, shown on a track and the brake as applied. Fig. 3 is a detail perspective view of the crank-shaft for operating the shoe-frames. Figs. 4 and 5 are detail perspective views of the shoe-frames in different positions. Figs. 6 and 7 are detail perspective views of the shoes disconnected.

Similar numerals of reference are employed to designate corresponding parts in the several figures of the drawings.

Referring to the drawings, the numeral 1 designates a truck of any preferred form of construction, having wheels 2, journaled thereon in the usual manner. At the points where the improved brake is applied in connection with the wheels, or adjacent to the latter, journal boxes 3 are secured to the truck frame and therein are journaled the ends of a crank-shaft 4 having cranks 5 adjacent to the ends of the same and to the center thereof is attached an arm 6 to which is secured a rod 7 having its opposite end movably connected to the lower end of a brake lever 8 which extends up through the truck or platform of the car in convenient position to the motor-man or grip-man or any other place for ready access. In this connection it will be understood that the well-known form of chain and vertical brake-shaft and wheel may be used in place of the rod 7 and the lever 8 with the same efficiency of operation. The cranks 5 of the crank-shaft 4 pass directly through openings 9 in the upper parts of oppositely disposed shoe-frames 10, which are connected by a series of cross-braces or rods 11 and thereby caused to act simultaneously in either of their operations. Each of the shoe-frames 10, is formed with a concaved side 12, in which is formed a slot 13, to receive a central flange 14 of a curved wheel-shoe 15, the said shoe being secured in position by suitable bolts applied in any well-known manner. The bottom of each of the shoe-frames 10 is formed also with a slot or recess 16, to receive the central flange 17 of a track-shoe 18 whose under-bearing surface at one side is formed with a depending flange 19, which is intended to bear against the inner side of the rail-head or a corresponding point in a rail-groove. The said track-shoe 18 is securely held in connection with the shoe-frame by any suitable form of bolt or other fastening and at one end is provided with a curved lip 20 that fits snugly against the curved angle 21 of the shoe-frame. The structure of the shoe-frame will be materially lightened by forming the same open as shown, without in the least impairing the durability and strength of the same. It will also be understood that the brake-shoes may be replaced at will after having become worn or otherwise injured. When the brake is not in use, as shown in Fig. 1, the crank-shaft is thrown forward and releases the pressure of the shoes 18 from the rails and also removes the shoes 15 from contact with the wheels. To assist in the operation of automatically drawing the shoe-frame away from the rails, coiled springs 22 and 23 are adapted to be attached at various points to the parts connecting the shoe-frames and the under side of the truck or platform of the car as well as the crank shaft and which are well-known expedients for the purpose of retracting or impelling and need not be further enlarged upon herein. When the friction of the track-shoes is brought to bear upon the rails, the shoe-frames are caused to drag backwardly until they strike the faces of the wheels which operation pushes the same along the track and immediately forms a brake upon the wheels at the same time. It will be seen that in proportion of the length of the shoes upon the rails or track and wheels will be the amount of friction exerted upon each and it is designed to have the shoe striking the wheel to be of that length, that the friction upon the wheel shall never be sufficient to stop the wheel from turning while the car moves, and that the shoe acting upon the track shall be of proper length to overcome the impetus of the car as desired. It will be seen that by attaching the shoes in the manner set forth the material surrounding the flanges is caused to sustain all the strain when the brake is in use and that the fastening for the said shoes only hold the same in place or keep them from falling out of position.

It will be obviously apparent that many minor changes in the construction of the minor details and the proportions of the several parts might be made and substituted for those shown and described, so long as they are within the scope of the invention without departing from the nature or spirit of the latter.

Having thus described the invention, what is claimed as new is—

1. In a car-brake the combination of shoe-frames carrying shoes which are adapted to unitedly engage the track and the wheels a crank-shaft having cranks near the opposite ends thereof, which directly pass through the upper parts of said shoe frames and means for operating said crank-shaft, substantially as described.

2. In a car-brake, the combination of shoe-frames carrying shoes at the bottom and one edge of each adapted to unitedly engage the track and wheels, a crank-shaft having cranks near the opposite ends which directly engage the upper parts of the said shoe-frames, cross-rods or braces connecting said shoe-frames, a rod attached to said crank-shaft, and means for operating said rod, to actuate the brake, substantially as described.

3. In a car-brake, the combination of shoe-frames carrying shoes at the bottom and one side edge of each, adapted to unitedly engage the track and wheels, a crank-shaft, having cranks near the opposite ends which directly engage the upper parts of the said shoe-frames, cross-rods or braces, connecting said shoe-frames, a rod attached to said crank-shaft, means for operating said rod to actuate the brake, and springs connected to the brake mechanism to automatically release the same, substantially as described.

In testimony whereof I have signed this specification in the presence of two subscribing witnesses.

HENRY B. CARY.

Witnesses:
 FRANK. H. MISSMORE,
 W. H. MATHER.